United States Patent
Okabe et al.

(10) Patent No.: US 6,540,428 B2
(45) Date of Patent: Apr. 1, 2003

(54) CAULKING ROLLER AND SINTERED FLANGED PULLEY CAULKED BY THE CAULKING ROLLER

(75) Inventors: Isamu Okabe, Osaka (JP); Kenichi Uotani, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 63 days.

(21) Appl. No.: 09/820,464

(22) Filed: Mar. 29, 2001

(65) Prior Publication Data

US 2001/0026727 A1 Oct. 4, 2001

(30) Foreign Application Priority Data

Mar. 29, 2000 (JP) ........................ 2000-091196

(51) Int. Cl.$^7$ .............. B21K 1/42; B23P 17/00
(52) U.S. Cl. ............ 403/279; 403/282; 403/375; 29/892; 29/892.11; 29/892.3; 474/902; 492/1; 492/27
(58) Field of Search ............... 403/278, 279, 403/282, 335, 373, 375, 274; 29/892, 892.11, 892.3; 474/152, 902; 492/1, 27

(56) References Cited

U.S. PATENT DOCUMENTS

| | | | | | |
|---|---|---|---|---|---|
| 16,804 | A | * | 3/1857 | Newton | 474/181 |
| 73,467 | A | * | 1/1868 | Seely | 72/85 |
| 199,368 | A | * | 1/1878 | Jones | 492/1 |
| 1,647,843 | A | * | 11/1927 | Smith | 492/1 |
| 2,470,508 | A | * | 5/1949 | Maky | 492/1 |
| 2,656,730 | A | * | 10/1953 | Mitchell | 492/1 |
| 2,929,089 | A | * | 3/1960 | Nall | 285/332.4 |
| 3,029,764 | A | * | 4/1962 | Sporck | 15/230.11 |
| 3,050,101 | A | * | 8/1962 | Nitkiewicz | 429/1 |
| 3,661,235 | A | * | 5/1972 | Harrison | 188/218 XL |
| 4,055,976 | A | * | 11/1977 | Kraft | 29/892.3 |
| 4,506,422 | A | * | 3/1985 | Egusa | 29/898.066 |
| 4,524,595 | A | * | 6/1985 | Oda | 29/892.3 |
| 4,579,289 | A | * | 4/1986 | Siebke | 241/110 |
| 4,639,238 | A | * | 1/1987 | Jaccod | 474/28 |
| 4,652,169 | A | * | 3/1987 | Matthews | 29/509 |
| 4,722,619 | A | * | 2/1988 | Reiser et al. | 29/509 |
| 4,996,859 | A | * | 3/1991 | Rose et al. | 72/86 |
| 5,221,183 | A | * | 6/1993 | Hoeffken | 29/509 |
| 5,284,398 | A | | 2/1994 | Sakai | |
| 5,328,773 | A | * | 7/1994 | Scott | 285/222 |
| 5,685,659 | A | * | 11/1997 | Brosius et al. | 16/386 |
| 5,823,904 | A | * | 10/1998 | Hodjat et al. | 29/892 |
| 5,855,444 | A | * | 1/1999 | Ohlson et al. | 29/525 |
| 5,951,422 | A | * | 9/1999 | Roes et al. | 29/892 |
| 5,987,952 | A | * | 11/1999 | Kutzscher et al. | 29/894.362 |
| 6,119,497 | A | * | 9/2000 | Eisele | 72/370.25 |

FOREIGN PATENT DOCUMENTS

JP 2000-107822 * 4/2000

* cited by examiner

*Primary Examiner*—Gary S. Hartmann
(74) *Attorney, Agent, or Firm*—Dann, Dorfman, Herrell and Skillman; Henry H. Skillman

(57) ABSTRACT

A sintered, flanged cam pulley includes a sintered cam pulley body and an annular flange caulked to the sintered cam pulley body. The sintered cam pulley body has at an end portion thereof an axial annular projection and a stepped portion formed on an outer periphery side of the annular projection. An inner peripheral surface of the annular flange is fitted on the stepped portion of the sintered cam pulley body. The tip of the annular projection is deformed plastically from the inner to the outer periphery side of the annular projection by a caulking roller. The caulking roller has a first conical surface of a large angle and a second conical surface of a small angle contiguous to the first conical surface, the first and second conical surfaces being formed on an outer peripheral surface of the caulking roller. The annular flange is thereby caulked to the sintered cam pulley body. It is possible to obtain a high flange pressure output and a high flange loosening torque and further possible to set a wide caulking quantity control range.

1 Claim, 7 Drawing Sheets

CAULKING ROLLER AND SINTERED FLANGED PULLEY CAULKED BY THE CAULKING ROLLER

BACKGROUND OF THE INVENTION

1. Field of the Invention

The present invention relates to a caulking roller and a sintered flanged pulley caulked by the caulking roller. Caulking is the operation in which two parts are joined tightly together to prevent leakage or slippage, in the present case by mating the two parts in the joint and upsetting the material of at least one of the two parts to interlock the parts and make them tight against one another.

2. Description of the Related Art

In a timing drive of a vehicular engine are used various pulleys on which a toothed belt is entrained, such as a cam pulley, a crank pulley, and an oil pump pulley. In each of these pulleys, annular flanges for keeping the position of the toothed belt and for preventing disengagement of the same belt are formed on both sides of a pulley body. However, the pulleys each having such annular flanges on both sides of its body are difficult to be formed integrally by sintering. According to the conventional method for fabricating sintered pulleys with annular flanges on both sides of their bodies, first a pulley body having a flange portion on one side is formed integrally by sintering, and then an annular flange formed using a separate material is caulked or tightly joined to the sintered pulley body.

FIGS. 4 and 5 illustrate a sintered, flanged cam pulley 1 as an example of a pulley to be used in a timing drive of a vehicular engine, of which FIG. 4 is a sectional view showing a state before caulking an annular flange 3 to a sintered cam pulley body 2 and FIG. 5 is a sectional view showing a caulked state of the annular flange 3 to the pulley body 2.

As shown in FIG. 4, teeth 2a are integrally formed on an outer periphery of the sintered cam pulley body 2, a flange portion 2b is integrally formed on an outer periphery of one end of the pulley body 2, and an axial bore 2c with key way is formed in a boss portion of the pulley body. Further, at the opposite end of the pulley body 2, i.e., on the side opposite to the integral flange portion 2b, there is formed an axial annular projection 2d. On an outer periphery side of the annular projection 2d is formed a stepped portion 2e. The tip of the annular projection 2d constitutes an allowance for caulking. The annular flange 3 is formed in a thin disc shape using a cold rolled steel sheet (e.g., SPCC) or a carbon steel (e.g., S35C).

The annular flange 3 is caulked to the sintered cam pulley body 2 in the following manner. An inner peripheral surface 3a of the annular flange 3 is fitted on the stepped portion 2e of the sintered cam pulley body 2 and then the tip of the annular projection 2d of the pulley body 2 is caulked by a caulking roller 9 which upsets the material of the projection to tightly join the flange 3 to the body 2.

FIGS. 6 and 7 illustrate a main portion of a caulking equipment 4 using rollers for caulking the sintered, flanged cam pulley 1 shown in FIGS. 4 and 5. FIG. 6 is a sectional showing a state before caulking in which the sintered, flanged cam pulley 1 is loaded into the caulking equipment 4, and FIG. 7 is a sectional view showing a state in which the sintered, flanged cam pulley loaded into the caulking equipment is being caulked.

As shown in FIGS. 6 and 7, the caulking equipment 4 using rollers are provided with a caulking head 5 and a jig 6, the caulking head 5 being threadedly connected with a lower end portion of a cylinder 7. Three to five caulking rollers 9 (two being shown in FIGS. 6 and 7) are mounted to a lower portion of the caulking head 5 at equal intervals in the circumferential direction, the caulking rollers 9 being supported rotatably on a roller support shaft 8 which extends in a direction perpendicular to the axis of the cylinder 7. The jig 6, which supports the sintered cam pulley body 2, is provided with a protrusion 6a at a position aligned with the axis of the cylinder 7.

FIG. 8 is a sectional view of the conventional caulking roller 9 used in the caulking equipment 4 shown in FIGS. 6 and 7.

FIGS. 9A and 9B are sectional views for explaining how to caulk the sintered, flanged cam pulley 1, using the conventional caulking roller 9 shown in FIG. 8. FIG. 9A is a partially sectional view showing a positional relation between the caulking roller 9 before caulking and the sintered, flanged cam pulley 1, and FIG. 9B is a partially sectional view of the sintered, flanged cam pulley 1 in a completely caulked state by the caulking roller 9.

The following description is now provided about caulking the sintered, flanged cam pulley 1 by means of the caulking equipment 4 using rollers which is shown in FIGS. 6 and 7. First, the axial bore 2c with key way formed in the sintered cam pulley body 2 is fitted on the protrusion 6a of the jig 6 and then, using the key way, the pulley body 2 is set so as not to rotate with respect to the jig 6. Subsequently, the inner peripheral surface 3a of the annular flange 3 is fitted on the stepped portion 2e of the sintered cam pulley body 2. Next, with use of a drive unit (not shown), the caulking head 5 is brought down while allowing it to rotate about the axis of the cylinder 7. As a result, the caulking rollers 9 in the caulking equipment come into abutment against end faces of the annular projection 2d of the sintered cam pulley body 2. As the caulking head 5 is further brought down under rotation, the caulking rollers 9, while rolling, cause the tip of the annular projection 2d to be upset or deformed plastically. As a result of this plastic deformation of the tip of the annular projection 2d, an excess metal portion is formed on both inner and outer periphery sides of the annular projection to complete the caulking work. In this way the annular flange 3 is fixed to the sintered cam pulley body 2.

However, since the toughness of the sintered cam pulley body 2 is lower than that of carbon steel (S35C), if the amount of caulking is taken too large in an effort to obtain a high flange pressure output and a high flange loosening torque, there arises the problem that the caulked portion of the sintered cam pulley body 2 is separated or the problem that the annular projection 2d of the pulley body 2 is cracked. Moreover, if the amount of caulking is small, the flange pressure output is low, making it impossible to obtain a predetermined performance, or the annular flange 3 becomes loose and rotates. In the conventional caulking work, therefore, the caulking quantity control range is narrow and production control is very difficult for obtaining a satisfactory performance of the sintered, flanged cam pulley 1.

The term "flange pressure output" as referred to herein represents a maximum load imposed axially on the sintered cam pulley body 2 corresponding to disengagement of the annular flange 3 from the pulley body. The term "flange loosening torque" represents a maximum torque imposed circumferentially on the annular flange 3 corresponding to loosening of the annular flange with respect to the sintered cam pulley body 2.

In caulking the annular flange to the sintered pulley body, other sintered flanged pulleys than the sintered, flanged cam pulley 1 described above also involve the same problems as above.

SUMMARY OF THE INVENTION

Accordingly, it is an object of the present invention to solve the above-mentioned problems of the prior art and provide a caulking roller capable of attaining a high flange pressure output and a high flange loosening torque and capable of widening the caulking quantity control range, as well as to provide a sintered flanged pulley caulked by such caulking roller.

For achieving the above-mentioned object, in the first aspect of the present invention there is provided a caulking roller for caulking an annular flange to a sintered pulley body, the caulking roller having a first conical surface of a first angle and a second conical surface of a second angle smaller than the first angle, the second conical surface being contiguous to the first conical surface, the first and second conical surfaces being formed on an outer peripheral surface of the caulking roller.

In the second aspect of the present invention there is provided a sintered flanged pulley comprising a sintered pulley body and an annular flange caulked to the sintered pulley body, the sintered pulley body having at an end portion thereof an axial annular projection and a stepped portion formed on an outer periphery side of the annular projection, wherein an inner peripheral surface of the annular flange is fitted on the stepped portion of the sintered pulley body, the tip of the annular projection is upset or deformed plastically from the inner periphery side of the annular projection to the outer periphery side thereof by a caulking roller, the caulking roller having a first conical surface of a first angle and a second conical surface of a second angle smaller than the first angle, the second conical surface being contiguous to the first conical surface, the first and second conical surfaces being formed on an outer peripheral surface of the caulking roller, and the annular flange is thereby caulked to the sintered pulley body.

The inner peripheral surface of the annular flange is fitted on the stepped portion of the sintered pulley body and then the caulking roller is brought down, with the result that the first conical surface of the caulking roller comes into abutment against an edge of the inner peripheral surface of the annular projection in the sintered pulley body. With this abutment, the caulking roller begins rolling. As the caulking roller is further brought down, the first conical surface of the caulking roller causes the tip of the annular projection to undergo a plastic deformation from the inner to the outer periphery side of the annular projection. With a further descent of the caulking roller, the second conical surface of the caulking roller causes the plastically deformed tip of the annular projection to undergo a further plastic deformation sideways of the annular flange, whereby the caulking work is completed without forming any excess metal portion on the inner periphery side of the projection. In this way the annular flange is fixed to the sintered pulley body effectively.

DESCRIPTION OF THE PREFERRED EMBODIMENT

Figures 1, 1A:
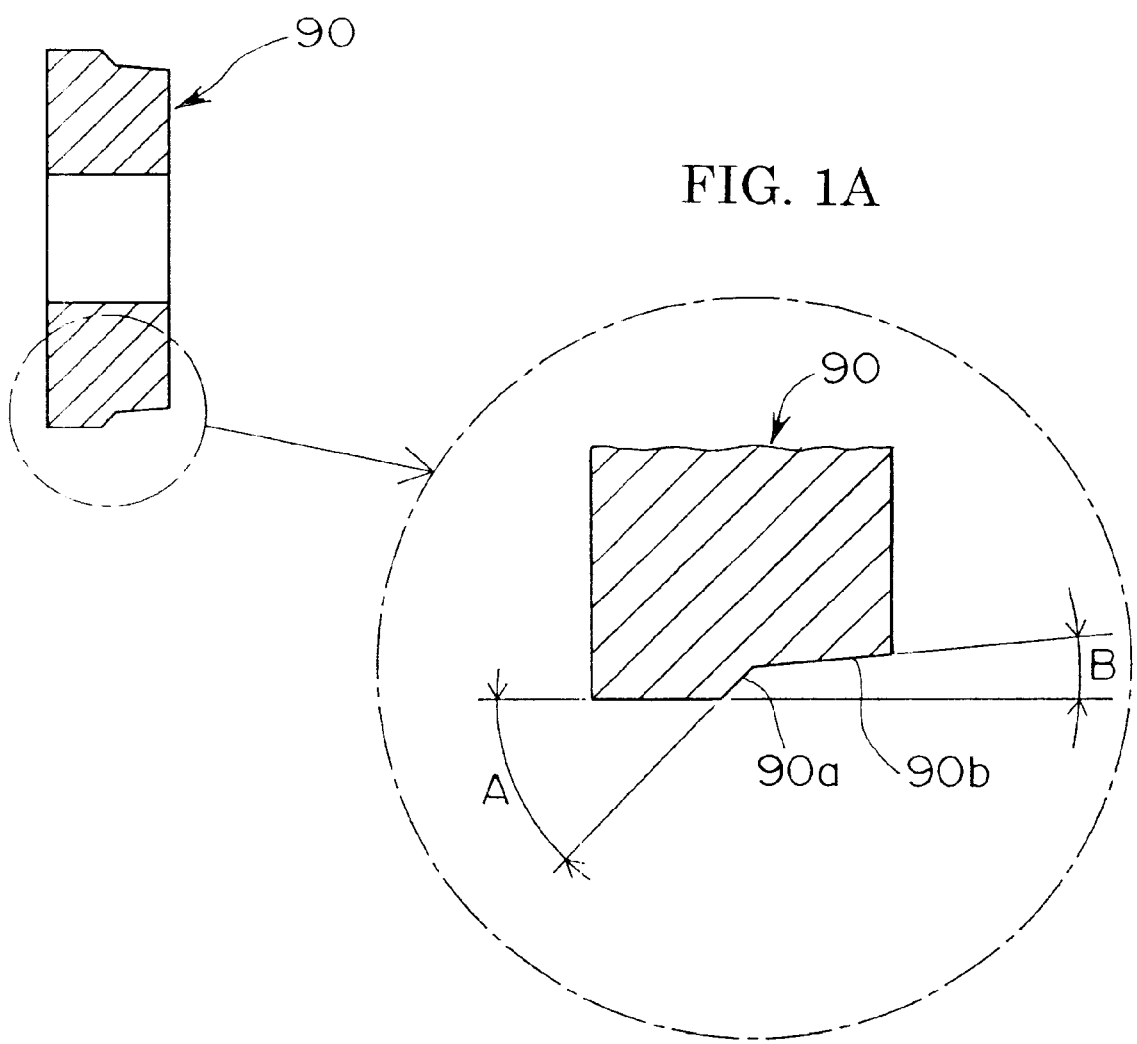
FIG. 1 is a sectional view of a caulking roller embodying the present invention.
FIG. 1A is an enlarged view of a portion of the caulking roller shown in FIG. 1.
Figure 2A:
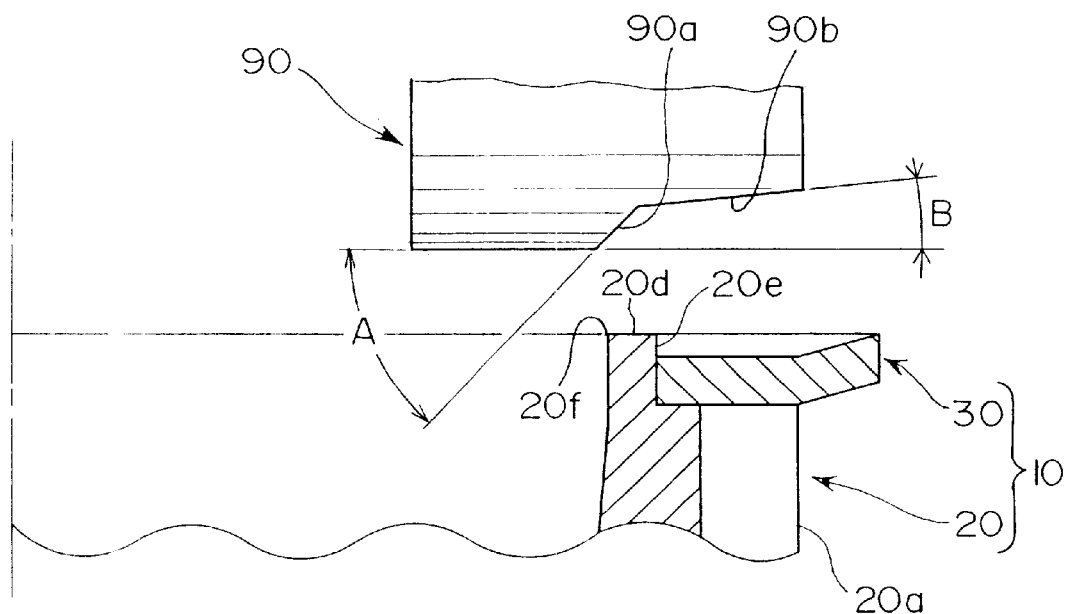
FIG. 2A is a sectional view showing a positional relation between the caulking roller and a sintered, flanged cam pulley before the caulking process.
Figure 2B:
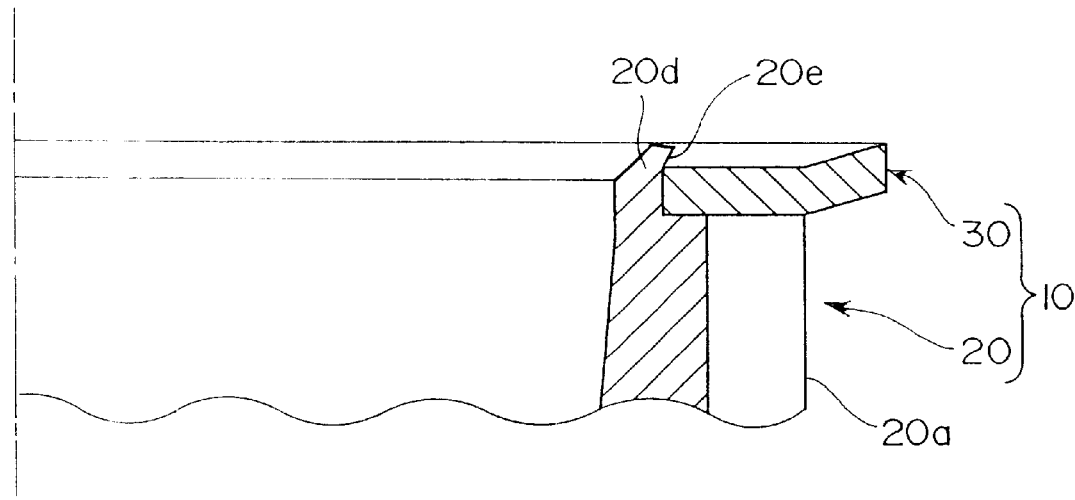
FIG. 2B is a sectional view of the sintered, flanged cam pulley in a completely caulked state by the caulking roller.
Figure 3:
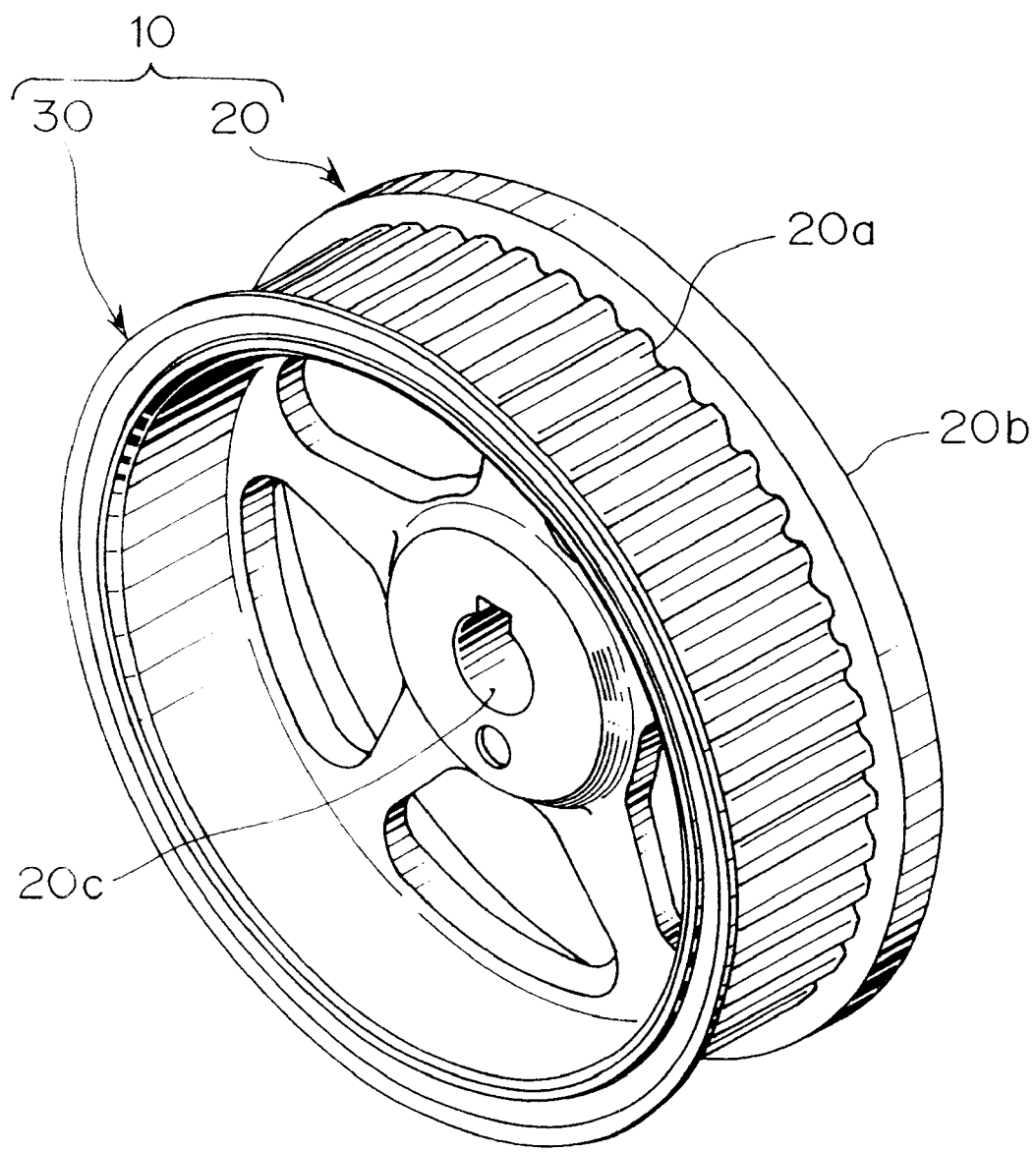
FIG. 3 is a perspective view showing the whole of a sintered, flanged cam pulley embodying the invention, which has been caulked by the caulking roller shown in FIG. 1.
Figure 4:
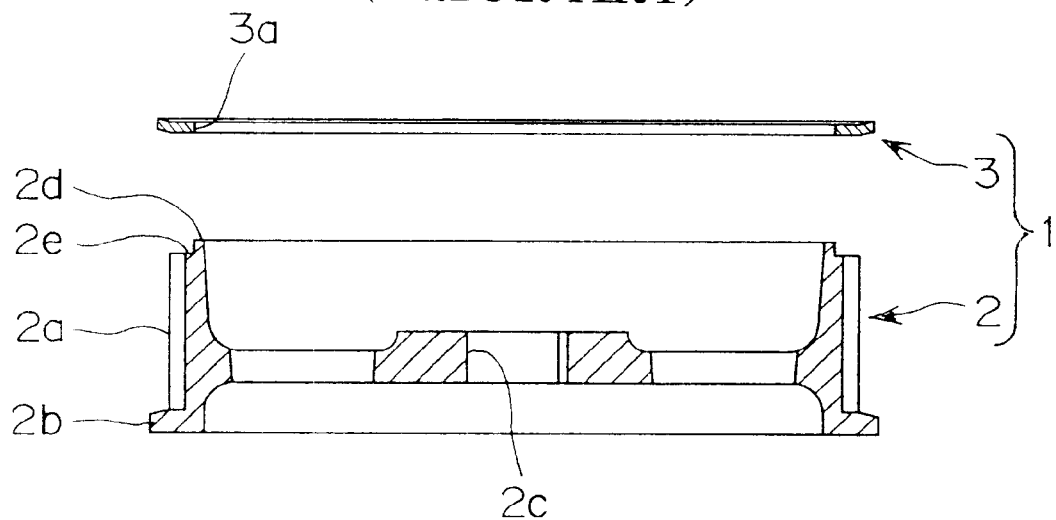
FIG. 4 is a sectional view before caulking according to the prior art of an annular flange and a sintered cam pulley body.
Figure 5:
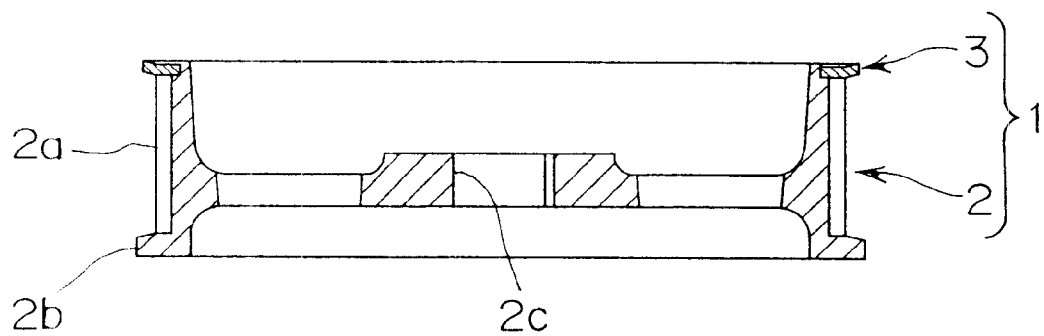
FIG. 5 is a sectional view showing a caulked state of the annular flange and the sintered cam pulley body illustrated in FIG. 4.

One preferred embodiment of the present invention will be described hereunder with reference to the accompanying drawings, in which FIG. 1 shows in cross section a caulking roller 90 embodying the present invention, FIG. 1A shows a portion of the caulking roller 9 on enlarged scale, FIGS. 2A and 2B are sectional views explanatory of caulking a sintered, flanged cam pulley 10, using the caulking roller 90 shown in FIG. 1, of which FIG. 2A shows a positional relation between the caulking roller 90 before caulking and the sintered, flanged cam pulley 10 and FIG. 2B shows the sintered, flanged cam pulley 10 in a completely caulked state by the caulking roller 90, and FIG. 3 is a perspective view showing the whole of the sintered, flanged cam pulley 10 embodying the invention after having been caulked by the caulking roller 90 which is illustrated in FIG. 1.

Figure 6:
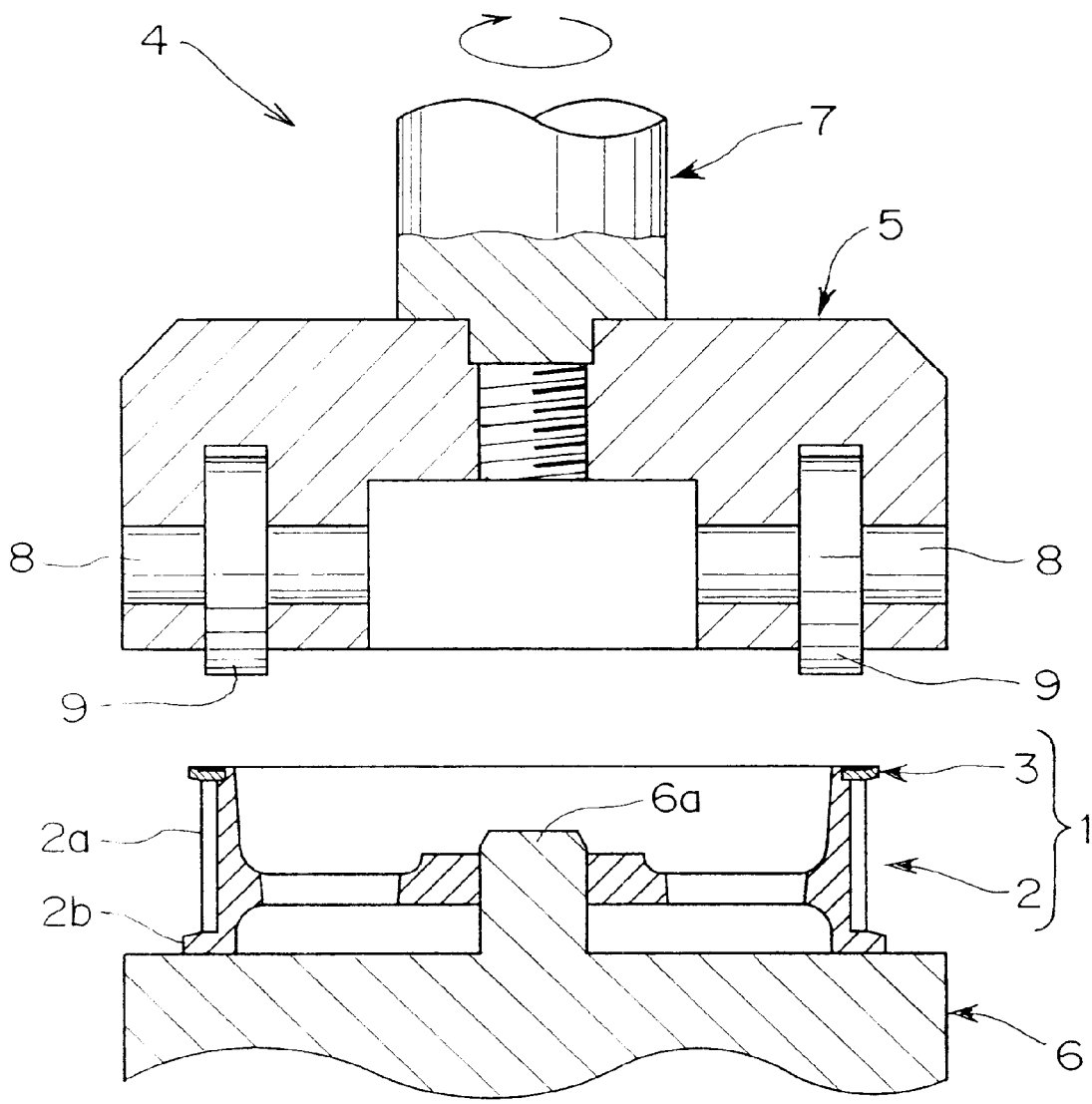
FIG. 6 is a sectional view of a conventional caulking equipment using rollers, showing a state before caulking in which the sintered, flanged cam pulley is loaded into the caulking equipment.
Figure 7:
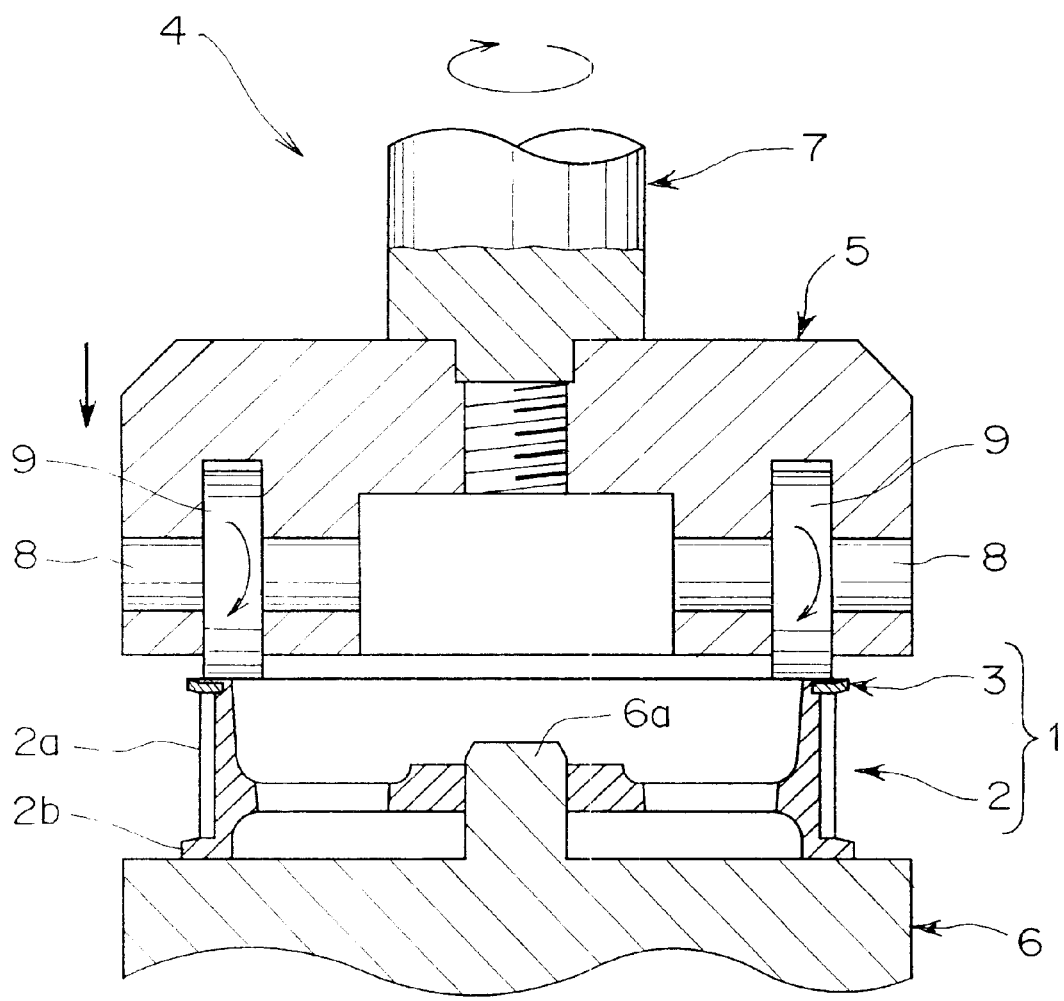
FIG. 7 is a sectional view of the principal portions, showing a state in which the sintered, flanged cam pulley loaded into the caulking equipment is being caulked.
Figure 8:
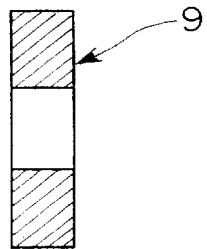
FIG. 8 is a sectional view of a conventional caulking roller used in the caulking equipment shown in FIGS. 6 and 7.
Figure 9A:
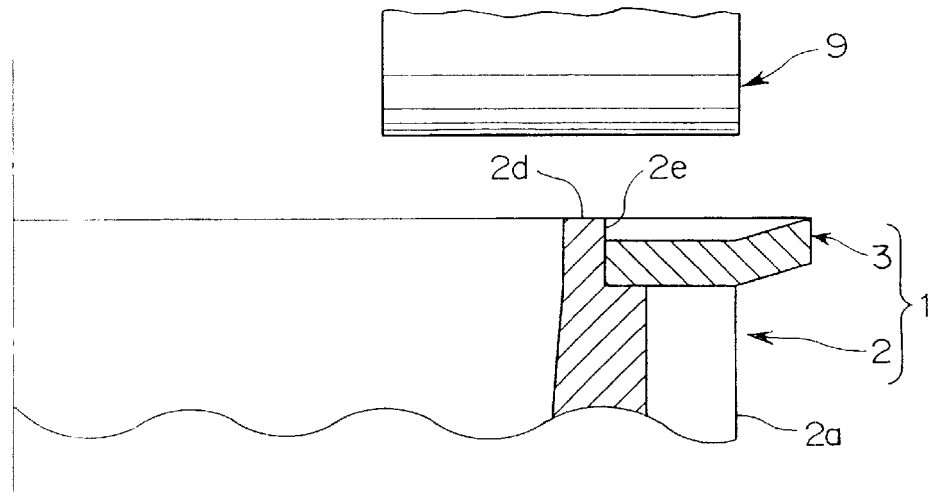
FIG. 9A is a sectional view showing a positional relation between the conventional caulking roller before caulking and a sintered, flanged cam pulley.
Figure 9B:
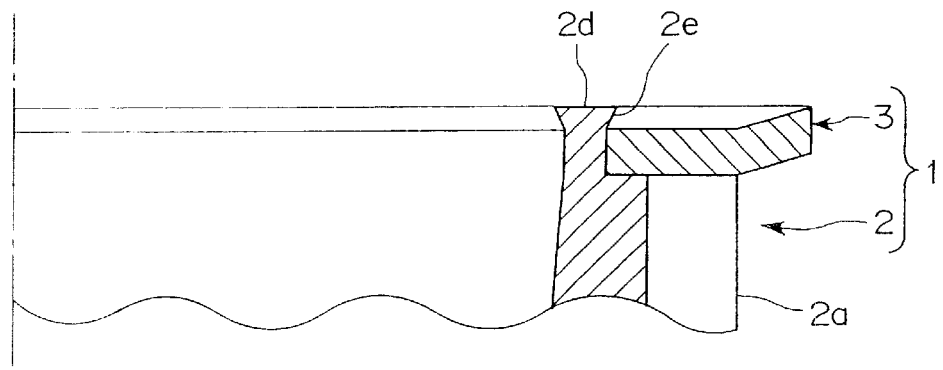
FIG. 9B is a sectional view of the sintered, flanged cam pulley in a completely caulked state by the conventional caulking roller.

The caulking roller 90 shown in FIG. 1 is used as a substitute for the caulking roller 9 installed in the conventional caulking equipment 4 using rollers which is illustrated in FIGS. 6 and 7. Therefore, explanations about the structure and operation of the caulking equipment using plural such caulking rollers 90 as shown in FIG. 1 will here be omitted.

As shown in FIG. 1, on an outer peripheral surface of the caulking roller 90 are formed a first conical surface 90a of a large angle A and a second conical surface 90b of a small angle B. The angle A of the first conical surface 90a is preferably in the range of 30 to 60. If the angle A does not fall under this range, no caulking effect will be exhibited or the caulked portion of a sintered cam pulley body 20 may be cracked. The angle B of the second conical surface 90b is preferably in the range of 0 to 15. If the angle B does not fall under this range, there may be obtained no effect or separation or cracking may occur in the caulked portion of the sintered cam pulley body 20. In the caulking roller 90 shown in FIG. 1, the angles A and B are set in the ranges of 40 to 50 and 2 to 8, respectively.

As shown in FIGS. 2A and 2B, the sintered, flanged cam pulley 10 embodying the invention, which is caulked by the caulking roller 90 shown in FIG. 1, is composed of the sintered cam pulley body 20 and an annular flange 30. Teeth 20a are integral with an outer periphery of the sintered cam pulley body 20, a flange portion 20b is integral with an outer periphery of one end portion of the pulley body 20, and an axial bore 20c with key way is formed in a boss portion. Further, on the side opposite to the integral flange portion 20b, an annular axial projection 20d is formed at an end portion. The annular projection 20d defines a stepped portion 20e radially outside the annular projection. The tip of the annular projection 20d constitutes an allowance for caulking. The annular flange 30 is formed in a thin, generally disc shape using a cold rolled steel sheet (e.g., SPCC) or a carbon steel (e.g., S35C).

The following description is now provided about the caulking work for the sintered, flanged cam pulley 10 using the caulking roller 90 shown in FIG. 1. As shown in FIGS. 2A and 2B, an inner peripheral surface 30a of the annular flange 30 is fitted on the stepped portion 20e of the sintered cam pulley body 20. Next, the caulking roller 90 is brought down, with the result that the first conical surface 90a of the caulking roller 90 comes into abutment against an edge 20f of the inner peripheral surface of the annular projection 20d in the sintered cam pulley body 20. With this abutment, the caulking roller 90 starts rolling. As the caulking roller 90 is further brought down, the first conical surface 90a of the caulking roller 90 causes the tip of the annular projection 20d to be deformed plastically from its inner periphery side toward its outer periphery side. With a further descent of the caulking roller 90, the second conical surface 90b of the caulking roller 90 causes the plastically deformed tip of the annular projection 20d to undergo a further plastic deformation sideways of the annular flange 30. By this plastic deformation of the tip of the annular projection 20d, the caulking work is completed without forming any excess metal portion on the inner periphery side of the annular projection 20d. In this way the annular flange 30 is fixed to the sintered cam pulley body 20 effectively.

Thus, in this embodiment of the present invention, since the tip of the annular projection 20d of the sintered cam pulley body 20 is deformed plastically from the inner to the outer periphery side of the annular projection 20d, an excess metal portion is not formed on the inner periphery side of the projection 20d and the annular flange 30 is fixed effectively to the sintered cam pulley body 20. Consequently, the flange pressure output and the flange loosening torque can be improved 30–70% greater than in the prior art. Besides, since the caulking quantity control range can be set wider than in the prior art, which is attained by such improvement of the flange pressure output, it becomes easier to effect a process control and the productivity is improved. Further, it is possible to eliminate the problems of separation and cracking of the sintered cam pulley body 20 caused by caulking.

Although in the sintered, flanged cam pulley 10 according to this embodiment, one annular flange 30 is caulked to the sintered cam pulley body 20, there may be adopted a modification wherein both right and left annular flanges 30 are caulked to the sintered cam pulley body 20.

Although the sintered, flanged cam pulley 10 is described in the above embodiment, the present invention is also applicable to other sintered, flanged pulleys wherein an annular flange is caulked to a sintered pulley body.

Further, although the sintered, flanged cam pulley 10 according to the above embodiment is a toothed pulley, the present invention is also applicable to a sintered flanged pulley free of teeth.

As set forth above, according to the caulking roller and the sintered flanged pulley caulked by the caulking roller, both of the present invention, there are attained the following effects.

Since the tip of the annular projection of the sintered pulley body is deformed plastically from the inner to the outer periphery side of the annular projection, an excess metal portion is not formed on the inner periphery side of the annular projection and hence the annular flange is fixed effectively to the sintered pulley body. Consequently, the flange pressure output and the flange loosening torque can be improved 30–70% greater than in the prior art.

Moreover, since the caulking quantity control range can be set wider than in the prior art, which is attained by the improvement of the flange pressure output, it becomes easier to effect a process control and the productivity is improved.

Further, it is possible to eliminate such problems as separation and cracking of the sintered pulley body.

Obviously, various minor changes and modifications of the present invention are possible in the light of the above teaching. It is therefore to be understood that within the scope of the appended claims, the present invention may be practiced otherwise than as specifically described.

What is claimed is:

1. A sintered flanged pulley comprising a sintered pulley body and an annular flange caulked to the sintered pulley body, said sintered pulley body having at an end portion thereof an axial annular projection and a stepped portion formed on an outer periphery side of said annular projection, wherein an inner peripheral surface of said annular flange is fitted on said stepped portion of said sintered pulley body, the tip of said annular projection being deformed plastically from the inner periphery side of the annular projection to the outer periphery side thereof by a caulking roller to cause the exposed portion of the tip to have conical surfaces conforming to the surfaces of the caulking roller, said caulking roller having a first conical surface of a first angle in the range of 40° to 50° and a second conical surface of a second angle in the range of 2° to 8°, the second conical surface being contiguous to the first conical surface, said first and second conical surfaces being formed on an outer peripheral surface of said caulking roller, and said annular flange is thereby caulked to said sintered pulley body with a first conical surface having an angle in the range of 40° to 50° and a second conical surface in the range of 2° to 8°.

* * * * *